(12) United States Patent
Lin et al.

(10) Patent No.: US 7,839,115 B2
(45) Date of Patent: Nov. 23, 2010

(54) POWER SWITCHING APPARATUS FOR NATURAL ENERGY POWER SUPPLY

(75) Inventors: Shan-Cheng Lin, Hsinchu (TW); Szu-Hung Lin, Hsinchu (TW)

(73) Assignee: Tranergy Technologies Co., Ltd., Hsinchu (TW)

( * ) Notice: Subject to any disclaimer, the term of this patent is extended or adjusted under 35 U.S.C. 154(b) by 466 days.

(21) Appl. No.: 11/955,459

(22) Filed: Dec. 13, 2007

(65) Prior Publication Data
US 2009/0153096 A1 Jun. 18, 2009

(51) Int. Cl.
*H01M 10/44* (2006.01)
*H02J 9/00* (2006.01)

(52) U.S. Cl. .......................................... 320/101; 307/66
(58) Field of Classification Search ................... 320/101; 307/64, 66
See application file for complete search history.

(56) References Cited

U.S. PATENT DOCUMENTS

| | | | | |
|---|---|---|---|---|
| 6,081,104 A * | 6/2000 | Kern | ........................... | 323/268 |
| 6,462,507 B2 * | 10/2002 | Fisher, Jr. | ................... | 320/101 |
| 2005/0036248 A1 * | 2/2005 | Klikic et al. | ................... | 361/42 |
| 2005/0063115 A1 * | 3/2005 | Nayar et al. | ................... | 361/82 |
| 2007/0029883 A1 * | 2/2007 | Yoshida | ...................... | 307/125 |
| 2008/0136365 A1 * | 6/2008 | Chan | .......................... | 320/101 |

* cited by examiner

*Primary Examiner*—Edward Tso
*Assistant Examiner*—M'Baye Diao
(74) *Attorney, Agent, or Firm*—Chun-Ming Shih

(57) ABSTRACT

A power switching apparatus for natural energy power supply includes a AC power supply provided by an electricity plant, a converting power supply connected with the AC power supply, a power switch connected with the converting power supply and an external load respectively, a charger connected with the power switch, at least a natural energy power supply connected with the charger, configured for generating electric power and supplying the electric power to the charger, a voltage sensor connected with the charger, and a battery pack connected with the voltage sensor. When there is not sufficient power output from the natural energy power supply, the AC power supply and the load are connected so that the object of uninterruptedly driving the load to work when the natural energy power supply stops working is achieved and the reliability of the natural energy power supply is improved.

4 Claims, 5 Drawing Sheets

_US 7,839,115 B2_

POWER SWITCHING APPARATUS FOR NATURAL ENERGY POWER SUPPLY

BACKGROUND OF THE INVENTION

1. Field of the Invention

The present invention relates to a natural energy power supplying apparatus, and more particularly to a power switching apparatus for switching a natural energy power supply to supply an alternating current power provided by an electricity plant as a complement to the natural energy power supply which supplies natural energies such as solar energy and wind energy.

2. Description of Related Art

Nowadays outdoor lightings for illumination or displaying purposes, such as signal lights, warning lights, neon lights, lights for display panels and etc, have adopted natural energy sources, such as solar energy and wind energy, as power supplies. As a result, the consumption of alternating current (AC) provided by the electricity plant is reduced and so is the cost of using AC. A conventional solar energy power supplying apparatus includes a solar cell module, a charger, and a battery pack. During the day, sun light is received by the solar cell module and electric power is generated. The electric power is supplied to the charger and used for charging the battery pack by the charger. The charging stops at dusk and during the night, the battery pack supplies the energy that is charged to it during the day to a load so as to drive the load to work. When the dawn comes, the load stops working because the energy stored in the battery pack is exhausted. A timer or a light sensor is sometimes set up to stop the load's working at the dawn. The solar cell module can be replaced by a wind power generator in the above setting.

However, the above-mentioned solar cell or wind energy power supplying apparatus, is subject to influences of time and weather, so that the power it supplies may not be stable and the battery may not be fully charged. As a result, the load may stops working before the dawn because there is no sufficient power in the battery pack, which is a problem that needs to be improved.

SUMMARY OF THE INVENTION

To improve the above problem, an object of the present invention is to provide a power switching apparatus for natural energy power supply, being disposed among a load, a natural energy power supply and an AC power supply provided by an electricity plant. In particular, when there is not sufficient power output from the natural energy power supply, the AC power supply and the load are connected so that the object of uninterruptedly driving the load to work when the natural energy power supply stops working is achieved and the reliability of the natural energy power supply is improved.

To achieve the above goal, the power switching apparatus for natural energy power supply in accordance with a preferred embodiment of the present invention includes:

a AC power supply provided by an electricity plant;
a converting power supply connected with the AC power supply;
a power switch, connected with the converting power supply and an external load respectively;
a charger, connected with the power switch;
at least a natural energy power supply, connected with the charger, configured for generating electric power and supplying the electric power to the charger;
a voltage sensor connected with the charger, wherein when a high voltage is sensed by the voltage sensor, the power switch is set to connect the load and the charger and when a low voltage is sensed by the voltage sensor, the power switch is set to connect the load and the converting power supply; and
a battery pack connected with the voltage sensor.

When the natural energy power supply supplies electric power, the charger receives the electric power from the natural energy power supply and supplies power to the battery pack so that a high voltage is sensed by the voltage sensor. When the natural energy power supply does not supply any electric power, the battery pack supplies power to the charger so that a high voltage is sensed by the voltage sensor while the charger supplies power from the battery pack to the load by the power switch. When electric energy in the battery pack is exhausted, the voltage sensor senses a low voltage, the converting power supply converts electric power from the alternating current power supply and supplies the converted power to the load by the power switch. Hence the AC power supply is used as a backup power supply.

The natural energy power supply is a solar cell module, a wind power generator or other natural energy sources.

According to another embodiment, the present invention further includes a light sensing switch, the light sensing switch being disposed on a circuit by which the AC power supply supplies power to the load via the converting power supply and the power switch, and being configured to close the circuit when no light is sensed by the light sensing switch and to open the circuit when light is sensed by the light sensing switch. More specifically, the light sensing switch is disposed on a circuit between the converting power supply and the power switch. Or alternatively, the light sensing switch is disposed on a circuit between the power switch and the load.

Other advantages and novel features will be drawn from the following detailed description of preferred embodiment with the attached drawings, in which:

DETAILED DESCRIPTION OF THE INVENTION

Figure 1:
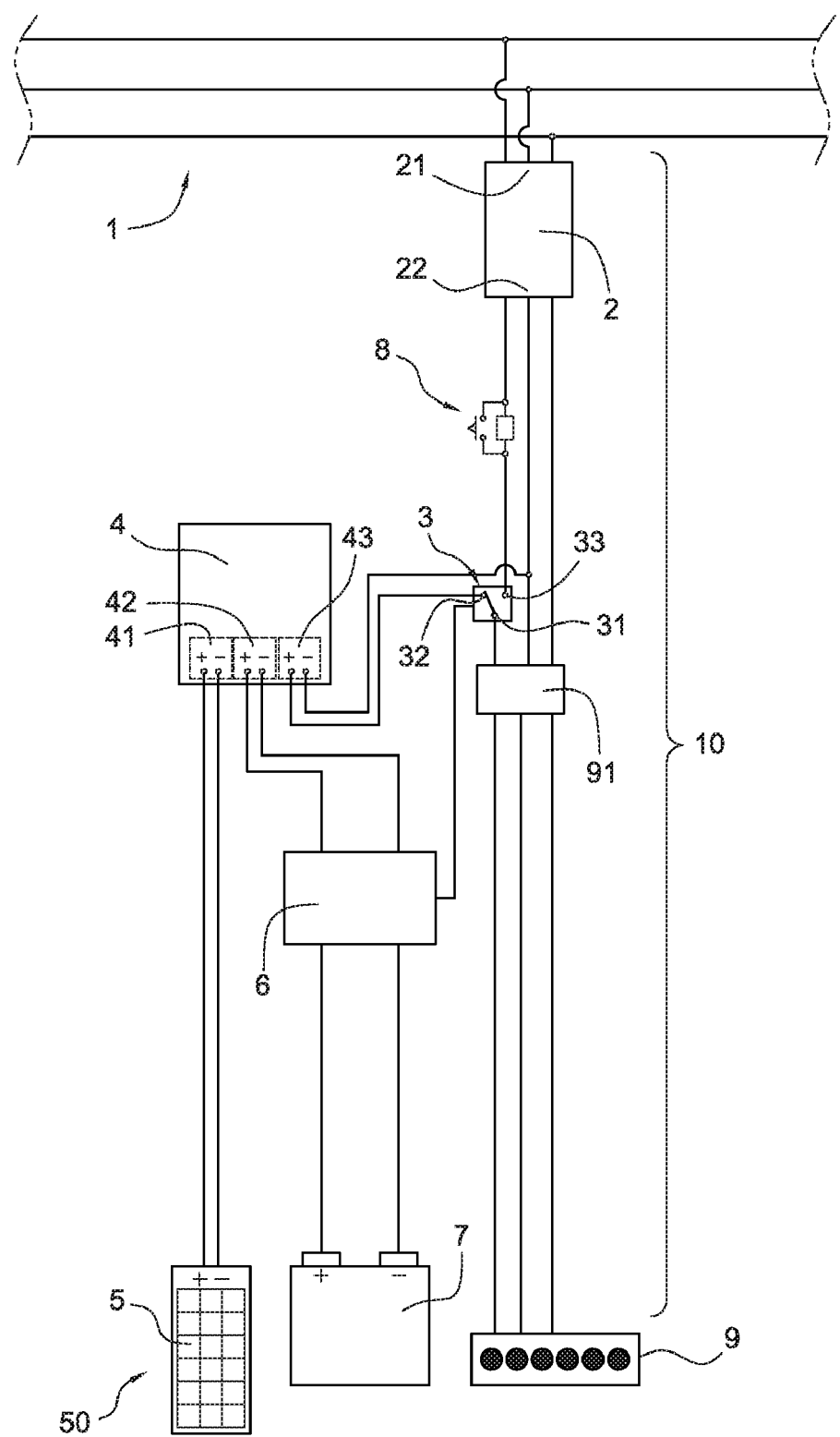
FIG. 1 is a schematic view of a power switching apparatus for natural energy power supply in accordance with a preferred embodiment of the present invention.

FIG. 1 is a schematic view of a power switching apparatus for natural energy power supply in accordance with a preferred embodiment of the present invention. FIG. 2 to FIG. 5 are schematic views of the power switching apparatus for natural energy power supply of FIG. 1 in different working statuses. The arrows in the figures denote current flowing directions. Referring to FIG. 1, the power switching apparatus for natural energy power supply includes:

a AC power supply 1 provided by an electricity plant;

a converting power supply 2, having an AC input port 21 and a DC output port 22, the AC input port 21 being connected with the AC power supply 1;

a power switch 3, having a first point 31, a second point 32 and a third point 33, the third point 33 being connected with the DC output port 22 of the converting power supply 2, the first point 31 being connected with an external DC load 9;

a charger 4, having a DC input port 41, a charging port 42 and a supplying port 43, the supplying port 43 being connected with the second point 32 of the power switch 3;

at least a natural energy power supply 50, connected with the DC input port 41 of the charger 4;

a voltage sensor 6 connected with the charging port 42 of the charger 4, wherein when a high voltage is sensed by the voltage sensor 6, the first point 31 of the power switch 3 is set to be connected with the second point 32 of the power switch 3 (referring to FIG. 2 and FIG. 3) so that load 9 and the charging port 43 of the charger 4 are connected, and when a low voltage that is lower than a predetermined value is sensed by the voltage sensor 6, the first point 31 of the power switch 3 is set to be connected with the third point 33 of the power switch 3 (referring to FIG. 4) so that the load 9 and the DC output port 22 of the converting power supply 2 are connected; and a battery pack 7 connected with the voltage sensor 6.

In this embodiment, the natural energy power supply 50 is a solar cell module 5, which can receive sun light and generate electric power and supply the electric power to the charger 4.

According to another preferred embodiment of the present invention, the power switching apparatus for natural energy power supply further includes a light sensing switch 8 disposed on a circuit 10 by which the AC power supply 1 supplies power to the load 9 via the converting power supply 2 and the power switch 3 (shown in FIG. 1). The light sensing switch 8 is a switch that includes a photo resistor, a photo diode, or a photo transistor. The light sensing switch 8 is closed when no light is sensed so as to close the circuit 10, and is open when light is sensed so as to open the circuit 10.

More specifically, the light sensing switch 8 is disposed on the circuit 10 between the converting power supply 2 and the power switch 3. Or alternatively, the light sensing switch 8 is disposed on the circuit 10 between the power switch 3 and the load 9 (shown in FIG. 5). A starter 91 is disposed on the circuit 10 between the power switch 3 and the load 9, which can receive the power supplied by the power switch 3 and drive the load 9.

The load 9 in this embodiment can be a fluorescent light, a LED light or a high intensity discharge lamp (HID).

Figure 2:
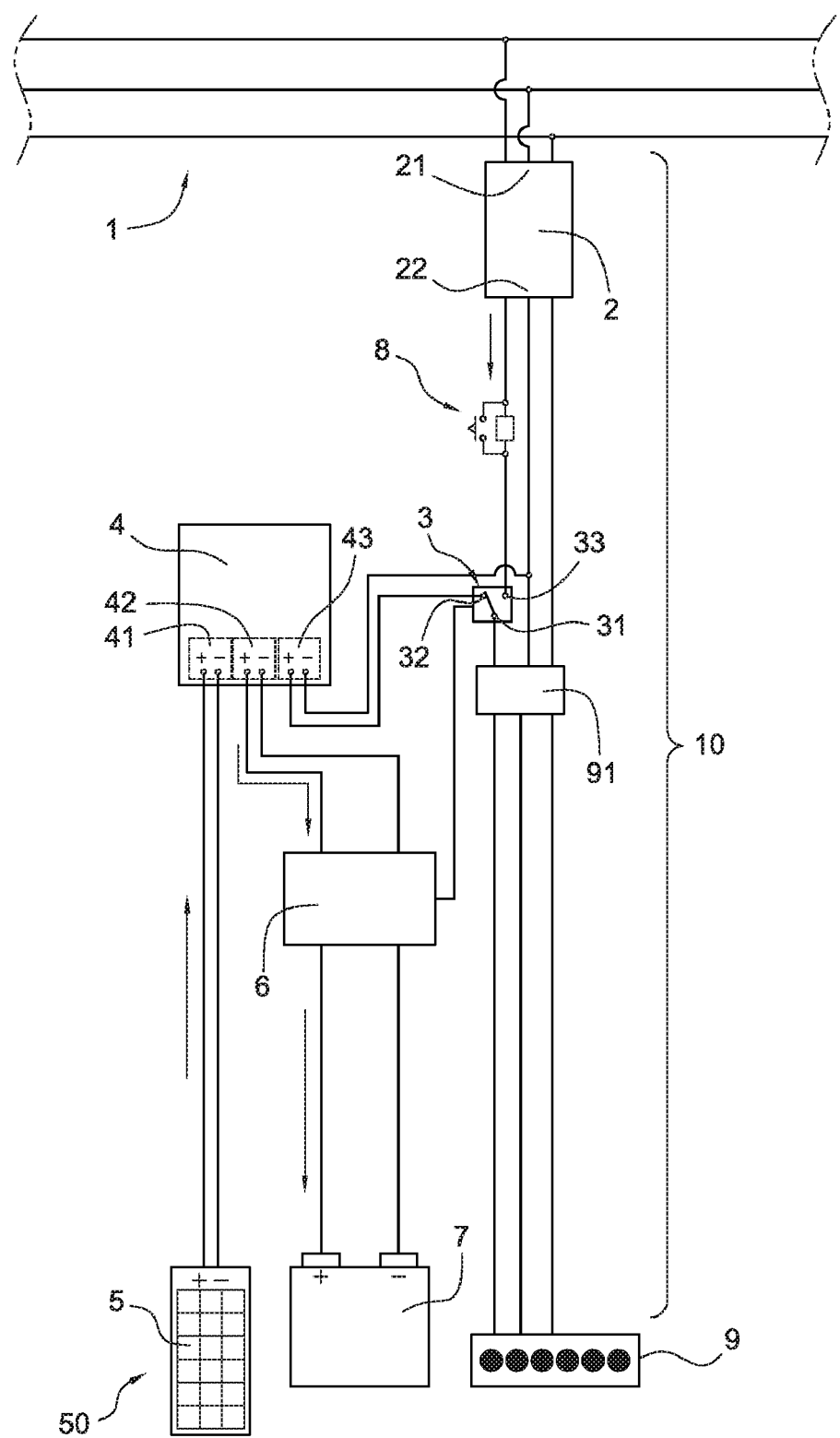
FIG. 2 is a schematic view of the power switching apparatus for natural energy power supply of FIG. 1 in a working status.
Figure 3:
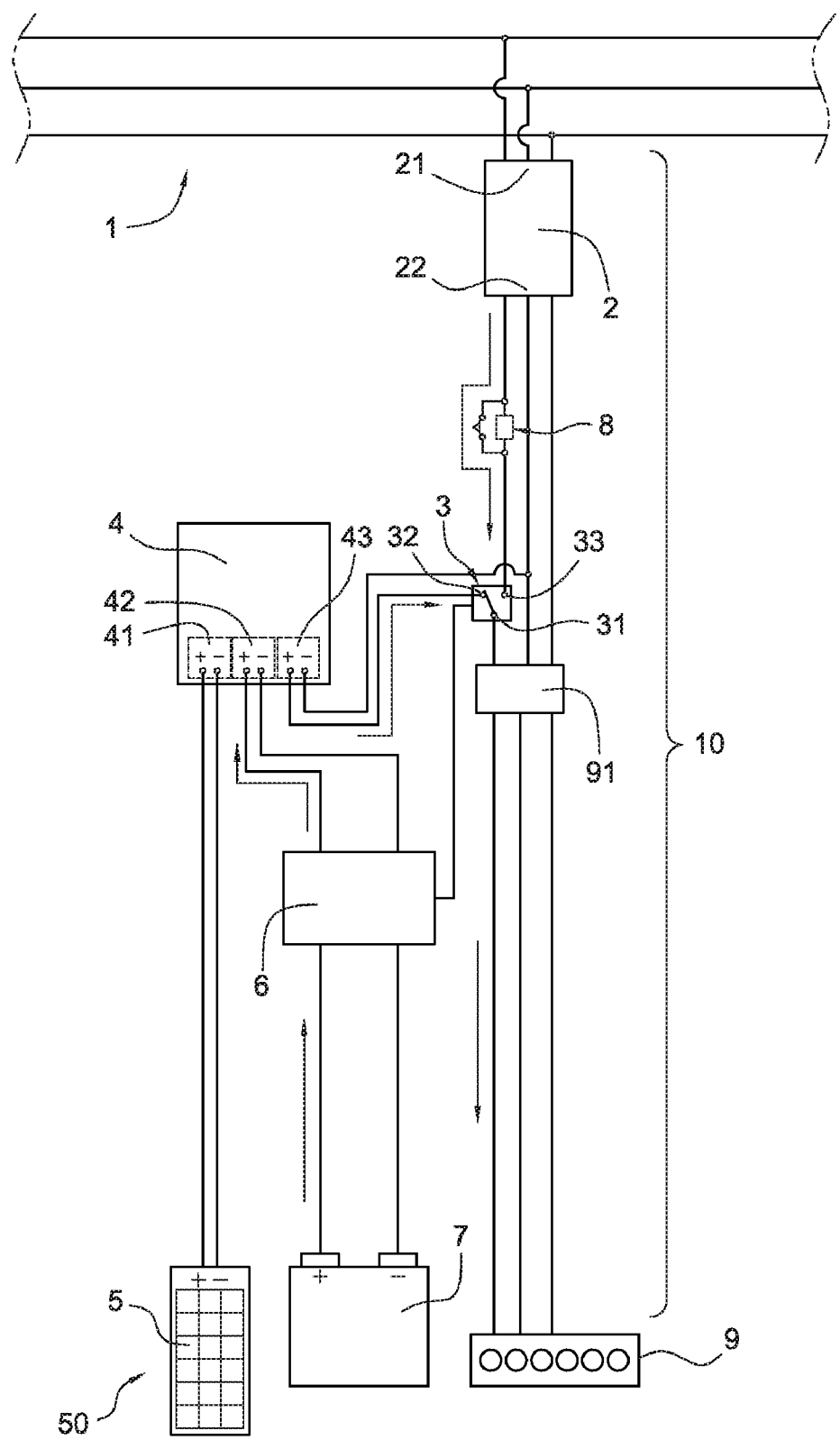
FIG. 3 is a schematic view of the power switching apparatus for natural energy power supply of FIG. 1 in another working status.
Figure 4:
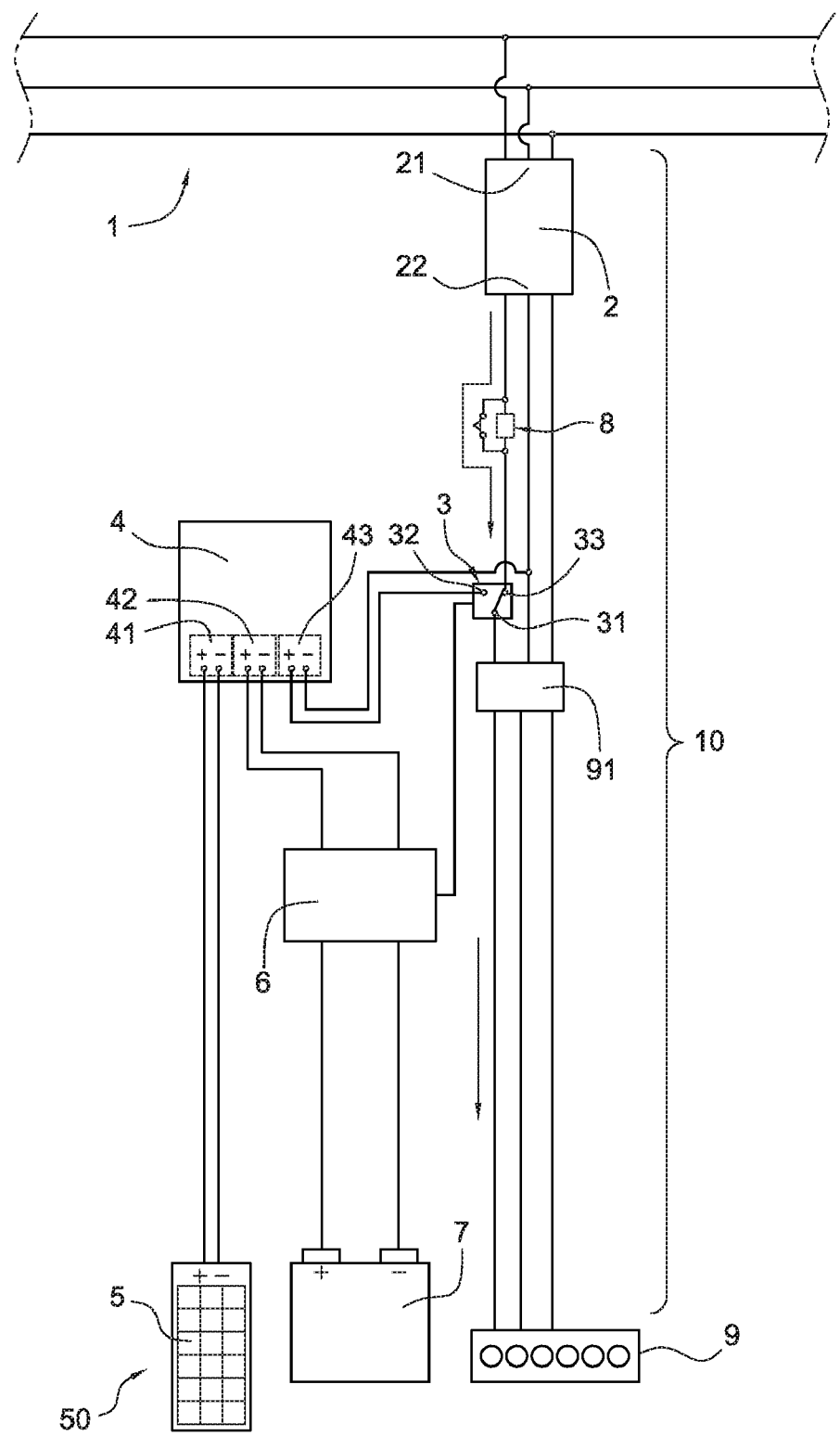
FIG. 4 is a schematic view of the power switching apparatus for natural energy power supply of FIG. 1 in still another working status.
Figure 5:
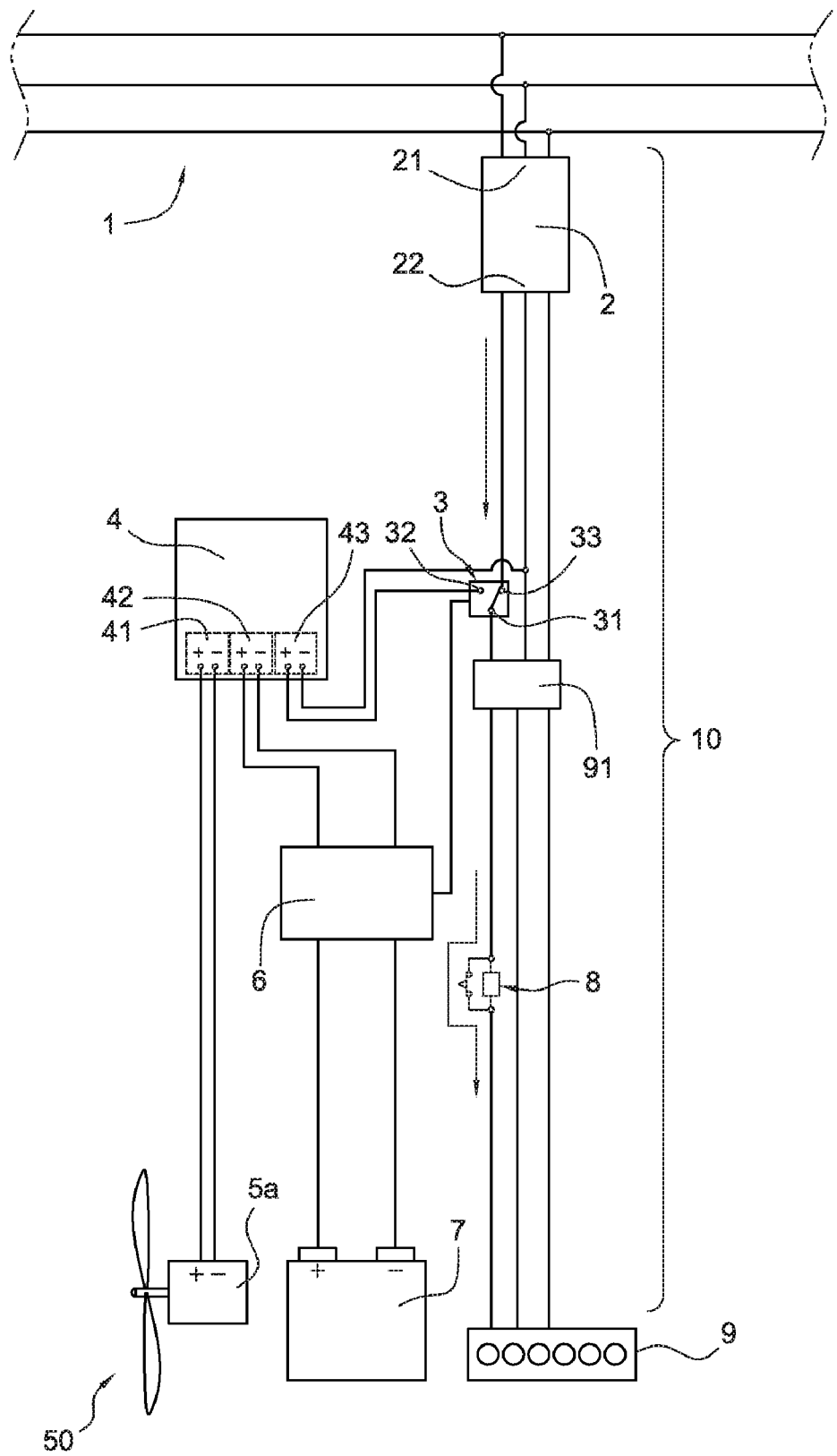
FIG. 5 is a schematic view of the power switching apparatus for natural energy power supply of FIG. 1 in yet another working status.

During the day, the solar cell module 5 receives sun light and generate electric power 9 (referring to FIG. 2). The DC input port 41 of the charger 4 can receive the electric power from the solar cell module 5, and charge the battery pack 7 via the charging port 42 so that voltage sensor 6 senses the high voltage with which the charger 4 charges the battery pack 7 and controls the power switch 3 to connect the load 9 and the starter 91 respectively to the supplying port 43 of the charger 4. In the meanwhile, the light sensing switch 8 can sense the sun light and be open so that that circuit 10 is open. The starter 91 and the load 8 are not working.

When the night comes, the solar cell module can not receive any sun light and hence can not generate any electric power. The battery pack 7 discharges DC to the charging port 42 of the charger 4 (shown in FIG. 3) so that the voltage sensor 6 senses the high voltage with which the battery pack 7 discharges the charger 4 and control the power switch 3 to connect the load 9 and the starter 91 respectively to the supplying port 43 of the charger 4. In the meanwhile, the light sensing switch does not sense any sun light and then be closed so that the circuit 10 is closed. Now, the charger 4 supplies the DC from the battery pack 7 to the starter 91 via the power switch 3 and the circuit 10 so as to drive the load 9. If energy stored in the battery pack 7 is exhausted before the day comes, the battery pack 7 stops discharging to the charger 4 (shown in FIG. 4) so that the voltage sensor 6 senses low voltage at both the battery pack 7 and the charging port 42 of the charger 4 and connect the load 9 and the starter 91 respectively to the DC output port 22 of the converting power supply 2. Now the converting power supply 2 converts the AC provided by the AC power supply 1 to DC and supplies the DC to the starter 91 via the power switch 3 and the circuit 10 so as to uninterruptedly drive the load 9 to work. Hence the AC power supply is used as a backup power supply. When the dawn comes, the light sensing switch can sense the dim light and be open so that the circuit 10 is open so that the converting power supply 2 can not supply the electric power provided by the AC power supply 1 to the load 9 via the circuit 10 and thus the load 9 stops working.

In above embodiments, the AC power supply 1 can be introduced to the circuit 10 when there is not sufficient light (such as during the night) by the light sensing switch 8 and when the battery pack 7 of the natural energy power supply can not supply sufficient power the load 9 is switched to be connected with the AC power supply 1 so as to uninterruptedly drive the load 9 to work. Hence the object of assisting the natural energy power supply to drive the load 9 during the specific time period is achieved and the reliability of the natural energy power supply is improved.

In still another embodiment, the natural energy power supply can be a wind power generator (shown in FIG. 5), or other power source using natural energy. When using a wind power generator 5a as the natural energy power supply 50, the wind power generator 5a can supply electric power to the charger 4 and thereby uninterruptedly charge the battery pack 7 all day if there is a driving wind. Hence, if the wind power generator 5a supplies power to the battery pack 7 during the night, the load 9 can uninterruptedly receive electric power from the battery pack 7 and be driven to work. The rest of this embodiment is the same as the other above-mentioned embodiments.

While the present invention has been illustrated by the description of preferred embodiments thereof, and while the preferred embodiments have been described in considerable detail, it is not intended to restrict or in any way limit the scope of the appended claims to such details. Additional advantages and modifications within the spirit and scope of the present invention will readily appear to those skilled in the art. Therefore, the present invention is not limited to the specific details and illustrative examples shown and described.

What is claimed is:

1. A power switching apparatus for natural energy power supply comprising:

a AC power supply provided by an electricity plant;

a converting power supply connected with the AC power supply;

a power switch, connected with the converting power supply and an external load respectively;

a charger, connected with the power switch;

at least a natural energy power supply, connected with the charger, configured for generating electric power and supplying the electric power to the charger;

a voltage sensor connected with the charger, wherein when a high voltage is sensed by the voltage sensor, the power switch is set to connect the load and the charger and when a low voltage is sensed by the voltage sensor, the power switch is set to connect the load and the converting power supply;

a battery pack connected with the voltage sensor, wherein when the natural energy power supply supplies electric power, the charger receives the electric power from the natural energy power supply and supplies power to the battery pack so that a high voltage is sensed by the voltage sensor, when the natural energy power supply does not supply any electric power, the battery pack supplies power to the charger so that a high voltage is sensed by the voltage sensor while the charger supplies power from the battery pack to the load by the power switch, when electric energy in the battery pack is exhausted, the voltage sensor senses a low voltage, the converting power supply converts electric power from the alternating current power supply and supplies the converted power to the load by the power switch; and a light sensing switch, the light sensing switch being disposed on a circuit by which the AC power supply supplies power to the load via the converting power supply and the power switch, and being configured to close the circuit when no light is sensed by the light sensing switch and to open the circuit when light is sensed by the light sensing switch.

2. The power switching apparatus for natural energy power supply as described in claim 1, wherein the natural energy power supply is a solar cell module, a wind power generator or other natural energy sources.

3. The power switching apparatus for natural energy power supply as described in claim 1, wherein the light sensing switch is disposed on a circuit between the converting power supply and the power switch.

4. The power switching apparatus for natural energy power supply as described in claim 1, wherein the light sensing switch is disposed on a circuit between the power switch and the load.

\* \* \* \* \*